(12) United States Patent
Kani

(10) Patent No.: US 8,722,785 B2
(45) Date of Patent: May 13, 2014

(54) PROCESS FOR PRODUCING EVOH COMPOSITE

(75) Inventor: Shouichi Kani, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 452 days.

(21) Appl. No.: 13/001,808

(22) PCT Filed: Jul. 2, 2008

(86) PCT No.: PCT/JP2008/062020
§ 371 (c)(1),
(2), (4) Date: Apr. 4, 2011

(87) PCT Pub. No.: WO2010/001471
PCT Pub. Date: Jan. 7, 2010

(65) Prior Publication Data
US 2011/0178222 A1 Jul. 21, 2011

(51) Int. Cl.
*C08F 16/06* (2006.01)
*C08K 5/04* (2006.01)
*C08K 3/00* (2006.01)
*C08L 29/04* (2006.01)

(52) U.S. Cl.
USPC ............ 524/446; 524/503; 428/36.6; 525/58; 525/56; 525/933

(58) Field of Classification Search
USPC ...................... 524/446, 503; 525/58, 56, 933; 428/36.6
See application file for complete search history.

(56) References Cited

U.S. PATENT DOCUMENTS

| | | | |
|---|---|---|---|
| 5,260,371 A | 11/1993 | Chen | |
| 5,428,094 A | 6/1995 | Tokoh et al. | |
| 5,766,751 A | 6/1998 | Kotani et al. | |
| 6,353,048 B1 | 3/2002 | Onishi et al. | |
| 2002/0135098 A1* | 9/2002 | Kawai et al. | 264/143 |
| 2002/0143098 A1* | 10/2002 | Kawai et al. | 524/503 |
| 2004/0019151 A1 | 1/2004 | Kawahara et al. | |
| 2004/0198889 A1 | 10/2004 | Noma et al. | |
| 2005/0186374 A1 | 8/2005 | Nakano et al. | |
| 2007/0106031 A1 | 5/2007 | Uchiumi et al. | |
| 2009/0075105 A1 | 3/2009 | Ono et al. | |
| 2009/0186233 A1 | 7/2009 | Masumoto et al. | |
| 2010/0136354 A1 | 6/2010 | Taniguchi et al. | |
| 2011/0020626 A1 | 1/2011 | Okamoto et al. | |

FOREIGN PATENT DOCUMENTS

| | | |
|---|---|---|
| EP | 0479031 | 4/1992 |
| EP | 0691202 | 1/1996 |
| EP | 1043361 | 10/2000 |
| EP | 1229077 | 8/2002 |
| EP | 1468819 | 10/2004 |
| EP | 1612228 | 1/2006 |
| JP | 5-39392 | 2/1993 |
| JP | 10-10867 | 7/1998 |
| JP | 2000001591 | 1/2000 |
| JP | 2000-191874 | 7/2000 |
| JP | 2001001476 | 1/2001 |
| JP | 2002003609 | * 1/2002 |
| JP | 2002003610 | 1/2002 |
| JP | 2002003611 | 1/2002 |
| JP | 2002069255 | 3/2002 |
| JP | 2002-293948 | 10/2002 |
| JP | 2002284887 | 10/2002 |
| JP | 2004131574 | 4/2004 |
| JP | 2004-315793 | 11/2004 |
| JP | 2006052351 | 2/2006 |
| JP | 200696815 | 4/2006 |
| JP | 2007-290378 | 11/2007 |
| JP | 2007-290379 | 11/2007 |
| JP | 2008-208327 | 9/2008 |

OTHER PUBLICATIONS

U.S. Appl. No. 12/809,127 to Yasufumi Beniya et al., which was filed on Jun. 18, 2010.
U.S. Appl. No. 13/057,298 to Shinji Okamoto et al., which was filed on Feb. 3, 2011.
Search report from E.P.O. that issued with respect to patent family member European Patent Application No. 08790824.0 on Nov. 29, 2011, mail date is Nov. 29, 2011.

* cited by examiner

*Primary Examiner* — James J Seidleck
*Assistant Examiner* — Deve E Valdez
(74) *Attorney, Agent, or Firm* — Greenblum & Bernstein, P.L.C.

(57) ABSTRACT

Provided is a composite of saponified product of an ethylene-vinyl ester-based copolymer from which films excellent in gas barrier properties and film rigidity and highly inhibited from having fish eyes are obtained.
It is a process for producing a composite of saponified product of an ethylene-vinyl ester-based copolymer, which comprises: mixing a composition (a) containing a saponified product of ethylene-vinyl ester-based copolymer (A1) and having a moisture content of 50% by weight or higher with a water-swellable layered inorganic compound (B) to obtain a composition (C); and mixing the composition (C) in the state of having a moisture content of 10% by weight or higher and less than 60% by weight with a saponified product of ethylene-vinyl ester-based copolymer (A2).

12 Claims, 1 Drawing Sheet

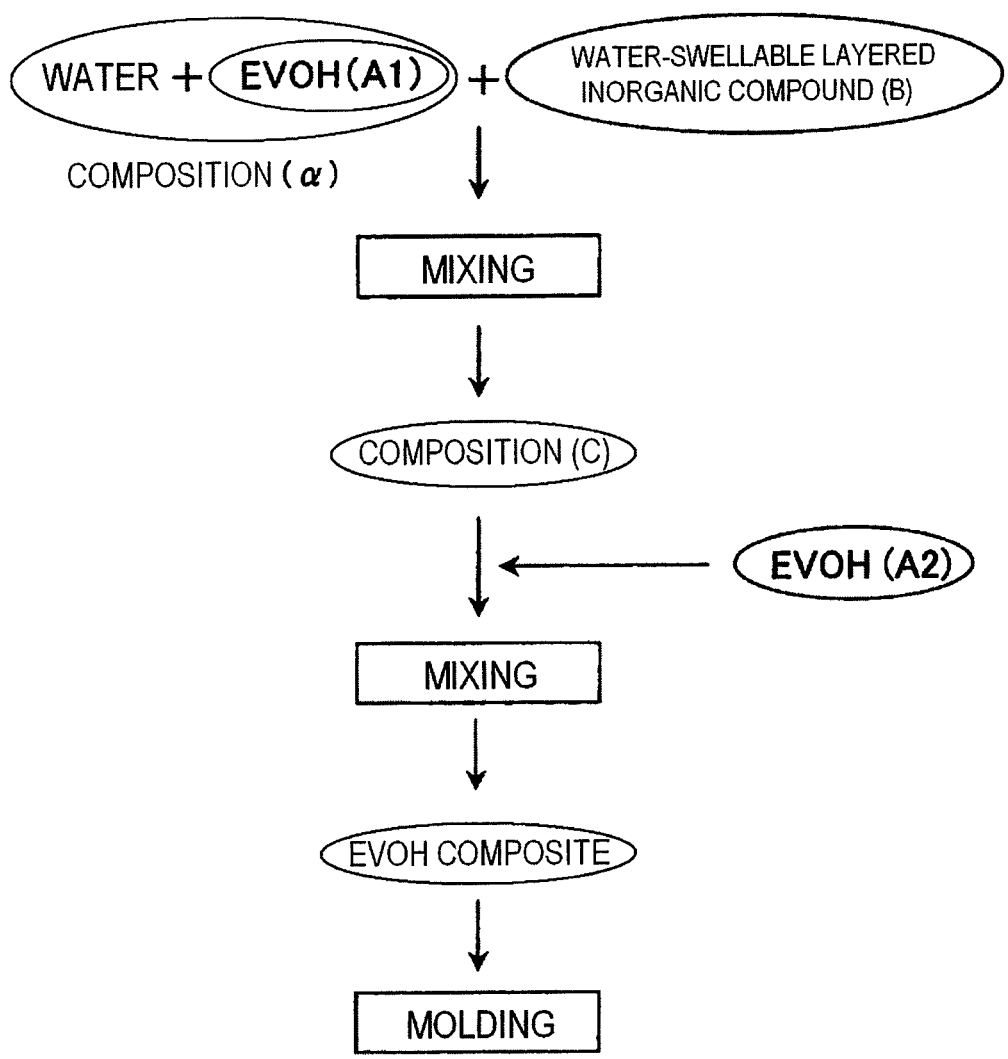

PROCESS FOR PRODUCING EVOH COMPOSITE

TECHNICAL FIELD

The present invention relates to a process for producing an EVOH composite comprising saponified product of an ethylene-vinyl ester-based copolymer and a water-swellable layered inorganic compound.

BACKGROUND ART

Techniques for dispersing a water-swellable layered inorganic compound such as montmorillonite in a saponified product of an ethylene-vinyl ester-based copolymer (hereinafter often abbreviated to EVOH) have conventionally been devised for use in the fields of packaging films for foods or chemicals, containers, and the like which are required to have a high degree of oxygen gas barrier properties. The term water-swellable layered inorganic compound means a compound having a structure of a plurality of stacked layers of an inorganic compound. In those techniques, the platy layers of the water-swellable layered inorganic compound are dispersed in the EVOH while being oriented in the same direction and function to inhibit oxygen from diffusing in the EVOH resin, and a film having high gas barrier properties is therefore obtained (see, for example, patent document 1).

It has conventionally been known that a composition excellent in gas barrier properties and transparency is obtained by mixing a high moisture content composition containing a specific EVOH with a water-swellable phyllosilicate to partly separate and disperse the layered structure of the phyllosilicate and thereby form many platy particles in the EVOH (see, for example, patent document 2 and patent document 3). With respect to this technique, a technique has been proposed in which an EVOH composition in a specific moisture-containing state is mixed, in a molten state, with a water-swellable layered inorganic compound to obtain a master batch and this master batch is diluted with an EVOH resin to thereby obtain a laminate excellent in gas barrier properties and transparency.

Patent Document 1: JP-A-5-39392
Patent Document 2: JP-A-2007-290378
Patent Document 3: JP-A-2007-290379

DISCLOSURE OF THE INVENTION

Problems To Be Solved By the Invention

According to the techniques described above, a film can be a high-quality barrier film only when the film satisfies all of the following: the film (1) retains high gas barrier properties and, simultaneously therewith, (2) has excellent film rigidity and (3) is highly inhibited from developing fish eyes.

Means for Solving the Problems

The present inventors diligently made investigations in view of those circumstances. As a result, it has been found that a film satisfying all of (1) to (3) shown above is obtained when a composition containing an EVOH and having a relatively high moisture content of 50% by weight or higher is first mixed with a water-swellable layered inorganic compound to obtain a master batch, and the resultant master batch which is not in an excessively dry state (for example, has a moisture content of 10% by weight or higher) is mixed with an EVOH to obtain an EVOH composite, which is formed into a film. The invention has been thus completed.

Namely, a summary of the invention is as follows.

[1] A process for producing a composite of saponified product of an ethylene-vinyl ester-based copolymer, which comprises mixing a composition (α) containing a saponified product of ethylene-vinyl ester-based copolymer (A1) and having a moisture content of 50% by weight or higher with a water-swellable layered inorganic compound (B) to obtain a composition (C) having a moisture content of 10% by weight or higher and less than 60% by weight, and then mixing the composition (C) with a saponified product of ethylene-vinyl ester-based copolymer (A2).

[2] The process for producing a composite of saponified product of an ethylene-vinyl ester-based copolymer according to [1], wherein the saponified product of ethylene-vinyl ester-based copolymer (A2) has a moisture content of less than 0.5% by weight.

[3] The process for producing a composite of saponified product of an ethylene-vinyl ester-based copolymer according to [1] or [2], wherein the mixing ratio (A1)/(B) of the saponified product of ethylene-vinyl ester-based copolymer (A1) to the water-swellable layered inorganic compound (B) is a proportion which satisfies 90/10 to 50/50 in terms of weight ratio.

[4] The process for producing a composite of saponified product of an ethylene-vinyl ester-based copolymer according to any one of [1] to [3], wherein the mixing ratio (C')/(A2) of a composition (C') which is the composition (C) in the state of having a moisture content regulated to 0.3% by weight to the saponified product of ethylene-vinyl ester-based copolymer (A2) is a proportion which satisfies 1/99 to 50/50 in terms of weight ratio.

[5] The process for producing a composite of saponified product of an ethylene-vinyl ester-based copolymer according to any one of [1] to [4], wherein the proportion {(A1)+(A2)}/(B) of the saponified products of ethylene-vinyl ester-based copolymers {(A1)+(A2)} to the water-swellable layered inorganic compound (B) is from 85/15 to 99.5/0.5 in terms of weight ratio in the composite of saponified product of an ethylene-vinyl ester-based copolymer.

[6] The process for producing a composite of saponified product of an ethylene-vinyl ester-based copolymer according to any one of [1] to [5], wherein the saponified product of ethylene-vinyl ester-based copolymer (A1) and the saponified product of ethylene-vinyl ester-based copolymer (A2) have an ethylene content of 20 to 60% by mole.

[7] The process for producing a composite of saponified product of an ethylene-vinyl ester-based copolymer according to any one of [1] to [6], wherein the saponified product of ethylene-vinyl ester-based copolymer (A1) and the saponified product of ethylene-vinyl ester-based copolymer (A2) have a degree of saponification of 90 to 100% by mole.

[8] The process for producing a composite of saponified product of an ethylene-vinyl ester-based copolymer according to any one of [1] to [7], wherein the saponified product of ethylene-vinyl ester-based copolymer (A1) and the saponified product of ethylene-vinyl ester-based copolymer (A2) have an MFR value of 1 to 100 g/10 min, as measured at 210° C. under a load of 2,160 g.

[9] The process for producing a composite of saponified product of an ethylene-vinyl ester-based copolymer according to any one of [1] to [8], wherein the water-swellable layered inorganic compound (B) is a smectites.

[10] The process for producing a composite of saponified product of an ethylene-vinyl ester-based copolymer according to any one of [1] to [9], wherein the water-swellable layered inorganic compound (B) has a swelling capacity in water of 40 mL/2 g or higher in terms of the value measured by the test method described in JBAS-104-77.

[11] The process for producing a composite of saponified product of an ethylene-vinyl ester-based copolymer according to any one of [1] to [10], wherein the water-swellable layered inorganic compound (B) has a particle diameter of 10 to 3,000 nm in terms of the value measured in accordance with JIS R 1629.

[12] The process for producing a composite of saponified product of an ethylene-vinyl ester-based copolymer according to any one of [1] to [11], wherein the composite of saponified product of an ethylene-vinyl ester-based copolymer has a moisture content of 0.001 to 5% by weight.

[13] The process for producing a composite of saponified product of an ethylene-vinyl ester-based copolymer according to any one of [1] to [12], wherein the saponified product of ethylene-vinyl ester-based copolymer (A1) and the saponified product of ethylene-vinyl ester-based copolymer (A2) are a saponified product of a copolymer of vinyl acetate and ethylene.

[14] A molded product comprising the composite of saponified product of an ethylene-vinyl ester-based copolymer obtained by the production process according to any one of [1] to [13].

[15] A laminate comprising at least one layer comprising the composite of saponified product of an ethylene-vinyl ester-based copolymer obtained by the production process according to any one of [1] to [13].

Advantageous of the Invention

According to the invention, when an EVOH composite obtained by mixing a composition (a) containing EVOH (A1) and having a moisture content of 50% by weight or higher with a water-swellable layered inorganic compound to obtain a master batch (composition (C)), and further mixing the resultant composition (C) which is not in an excessively dry state (for example, has a moisture content of 10% by weight or higher) with EVOH (A2) is formed into a film, then the above-described remarkable effect of satisfying all of the requirements, i.e., (1) to retain high gas barrier properties, (2) to have excellent film rigidity, and (3) to be highly inhibited from developing fish eyes, is obtained. This is probably because the composition (C) is inhibited from having insufficient flowability and agglomerating without evenly diffusing in the EVOH (A2).

The film obtained from the EVOH composite obtained in the invention can be used by itself or as a laminated film with a film of another resin, such as a polyolefin or polyamide, or as a laminate thereof with any of various substrates. For example, molded containers, such as cups, trays, tubes, and bottles, and bags and cap members constituted of stretched films are suitable for use in applications such as containers for general foods and various containers, e.g., condiments such as mayonnaise and dressings, fermented foods such as soybean paste (miso), edible fats and oils such as salad oil, beverages, cosmetics, medicines, detergents, perfumes, industrial chemicals, agricultural chemicals, and fuels.

BRIEF DESCRIPTION OF THE DRAWING

FIG. 1 is a flowchart diagrammatically illustrating the production of an EVOH composite in the Examples according to the invention.

BEST MODE FOR CARRYING OUT THE INVENTION

The invention is explained below in detail.

The following explanations on constituent elements are for embodiments (typical embodiments) of the invention, and the invention should not be construed as being limited to the embodiments.

The invention relates to a process for producing an EVOH composite, which comprises mixing a composition (a) containing EVOH (A1) and having a relatively high moisture content of 50% by weight or higher with a water-swellable layered inorganic compound (B), and then mixing the resultant composition (C) having a moisture content of 10% by weight or higher and less than 60% by weight with EVOH (A2). In the EVOH composite obtained, the water-swellable layered inorganic compound (B) is present in the state of being dispersed in the EVOH (A), namely, in {EVOH (A1)+ EVOH (A2)}.

(Method of Calculating Moisture Content)

The moisture content of the composition ($\alpha$) of EVOH (A1) and water in the invention is measured/calculated by the following method.

[Method of Measuring Moisture Content]

The composition ($\alpha$) of EVOH (A1) and water is weighed with an electronic weighing machine to measure the weight thereof ($W_1$), and dried in a 150° C. hot-air drying oven for 5 hours, followed by allowing to cool in a desiccator for 30 minutes, and then it is weighed to measure the weight thereof ($W_2$). The moisture content is calculated using the following equation.

$$\text{Moisture content(wt \%)}=[(W_1-W_2)/W_1]\times 100$$

Incidentally, the moisture content of the composition (C), which is to be obtained by mixing the composition ($\alpha$) of EVOH (A1) and water with a water-swellable layered inorganic compound (B), and the moisture content of the EVOH composite to be obtained by mixing the composition (C) with EVOH (A2) are calculated in the same manner.

Since an EVOH generally is a hydrophilic resin comprising hydroxyl groups, an EVOH produced by known production processes contains a slight amount of moisture, which is usually less than 0.5% by weight, in particular, 0.3% by weight or less.

(Explanation of EVOH (A))

First, the EVOH to be used in the invention is a polymer usually obtained by saponifying a copolymer of vinyl acetate and ethylene, and has a copolymer structure which comprises ethylene structural units, vinyl alcohol structural units formed by saponification, and vinyl acetate structural units remaining in some cases. The EVOH may optionally contain a small amount of structural units derived from other copolymerizable vinyl monomers.

In the invention, a saponified product of an ethylene-vinyl ester-based copolymer itself is referred to as EVOH (A). Of such copolymers, the EVOH (A) to be mixed with a water-swellable layered compound (B) in the beginning is referred to as EVOH (A1) for convenience, and the EVOH (A) to be mixed with the composition (C) is referred to as EVOH (A2). Consequently, the EVOH (A) in the EVOH composite to be obtained in the invention are {EVOH (A1)+EVOH (A2)}.

The EVOH (A) to be used in the invention are not limited so long as the copolymers are a conventionally known general EVOH. For example, the EVOH (A) specifically have an ethylene content of generally 20 to 60% by mole, preferably 20 to 45% by mole, especially preferably 20 to 35% by mole. In case where the ethylene content thereof is too low, there is a tendency that thermal stability is reduced during melt molding. In case where the ethylene content thereof is too high, there is a possibility that gas barrier properties tend to be lowered and the mixing of the composition (α) of such EVOH (A1) and water with a water-swellable layered inorganic compound (B) results in an increased torque. There is hence a possibility that the water-swellable layered inorganic compound might be excessively smashed into fine particles, making it impossible to sufficiently obtain the effect of improving gas barrier properties.

The degree of saponification of the EVOH (A) is generally 90 to 100% by mole, preferably 95 to 100% by mole, especially preferably 99 to 100% by mole. In case where the degree of saponification thereof is too low, gas barrier properties tend to be lowered.

The value MFR value of the EVOH (A), as measured at 210° C. under a load of 2,160 g, is generally 1 to 100 g/10 min, preferably 2 to 50 g/10 min, especially preferably 5 to 40 g/10 min. In case where the MFR value thereof is too low, a higher load tends to be required for melt processing, resulting in reduced processability. In case where the MFR value thereof is too high, there is a tendency that the viscosity become insufficient during melt processing to pose problems concerning sagging or the like and hence the formability into films or the like is reduced.

The EVOH (A) to be used in the invention may be ones in which a known copolymerizable ethylenically unsaturated monomer has been copolymerized in such an amount that the effects of the invention are not lessened thereby. For example, such a monomer may have been copolymerized to a content thereof in the EVOH (A) of about 10% by mole or lower.

Furthermore, the EVOH (A) may be ones which have undergone a known post-treatment for modification, such as urethanation, acetalization, cyanoethylation, or oxyalkylation.

In the case where the EVOH composite of the invention is to be used for stretched films, heat-shrinkable films, draw-molded articles such as cups, or blow-molded articles such as bottles, use of an EVOH (A) in which the structural unit (1) shown below has been copolymerized in an amount in the range of 0.1 to 10% by mole is also suitable.

[Chem. 1]

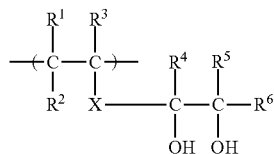

(1)

[In structural unit (1), $R^1$, $R^2$, and $R^3$ each independently represent a hydrogen atom or an organic group; X represents a single bond or a bonding chain; and $R^4$, $R^5$, and $R^6$ each independently represent a hydrogen atom or an organic group.]

All of $R^1$ to $R^3$, which are substituents bonded to the main chain, and of $R^4$ to $R^6$, which are substituents bonded to a side chain, in the structural unit (1) typically are hydrogen atom. However, the structural unit (1) may be one in which those hydrogen atoms have been replaced with organic groups to such a degree that the properties of the resin are not considerably impaired thereby. The organic groups are not particularly limited. However, the organic groups preferably are, for example, alkyl groups having 1 to 4 carbon atoms, such as methyl group, ethyl group, n-propyl group, isopropyl group, n-butyl group, isobutyl group, and tert-butyl group, and the organic group may have substituents such as halogen group, hydroxyl group, ester group, carboxyl group, and sulfo group according to need.

The bonding chain X in the structural unit (1) typically is a single bond. However, X may be a bonding chain which does not considerably impair resin properties. The bonding chain is not particularly limited, and examples hereof include non-aromatic hydrocarbon chains such as alkylenes, alkenylenes, and alkynylenes and aromatic hydrocarbon chains such as phenylene and naphthylene (these hydrocarbons may have been substituted with halogen, e.g., fluorine, chlorine, or bromine), and further include —O—, —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, —OAl(OR)O—, and the like (Rs each independently are any desired substituent and preferably are a hydrogen atom or an alkyl group, and m is a natural number). From the standpoint of thermal melt stability, non-aromatic hydrocarbon chains are preferred of these, and alkylenes are especially preferred. Alkylenes having 3 or less carbon atoms are suitable.

From the standpoint of improving thermal stability during melt molding, it is preferred to add an organic acid such as acetic acid, propionic acid, butyric acid, lauric acid, stearic acid, oleic acid, or behenic acid, an inorganic acid such as sulfuric acid, sulfurous acid, carbonic acid, boric acid, or phosphoric acid, or a salt thereof with an alkali metal, alkaline earth metal, transition metal, or the like to the EVOH (A) so long as this addition does not defeat the objects of the invention.

The EVOH (A1) and EVOH (A2) to be used in the invention may be a blend obtained by mixing two or more EVOH differing in structural unit, differing in ethylene content, differing in degree of saponification, or differing in molecular weight, etc.

Methods for producing two or more different EVOH (blend) are not particularly limited, and examples thereof include a method in which each pastes of unsaponified product of ethylene-vinyl ester-based copolymers are mixed together and then saponified, a method in which solutions of each EVOH, which have been saponified, dissolved in an alcohol or in a water/alcohol mixed solvent are mixed together, and a method in which EVOH each in a pellet or powder form are mixed together and then melt-kneaded.

The EVOH (A1) and EVOH (A2) to be used may be equal to each other in ethylene content, degree of saponification, kind of modifying group, and content of modifying group so long as these properties are within the ranges shown above, or may differ from each other in any of these properties according to purposes. In the case where EVOH differing in ethylene content are used, it is preferred that the difference in ethylene content therebetween should be generally 1 to 30% by mole, preferably 2 to 25% by mole, especially preferably 2 to 20% by mole. Too large difference in ethylene content tends to result in poor stretchability.

The content of the EVOH (A), i.e., the amount of {EVOH (A1)+EVOH (A2)}, in the EVOH composite of the invention is generally 70 to 99.5% by weight, preferably 80 to 99% by weight, especially preferably 90 to 98% by weight, based on the overall weight of the EVOH composite. In case where the content of the EVOH (A) is too low, the EVOH composite tends to have an increased melt viscosity, resulting in reduced melt moldability. Conversely, in case where the content thereof is too high, there is a tendency that the effect of improving gas barrier properties, which is a feature of the invention, is not sufficiently obtained.

(Explanation of Water-Swellable Layered Inorganic Compound (B))

Next, the water-swellable layered inorganic compound (B) to be used in the invention is explained.

The water-swellable layered inorganic compound (B) to be used in the invention means a compound which is known as a swellable clay mineral such as a phyllosilicate and has a layered structure of unit crystal layers stacked together and which has relatively weak bonding between the unit crystal layers and, hence, swells at the interstices between the unit crystal layers by the action of water to render the unit crystal layers capable of exfoliating. The water-swellable layered inorganic compound (B) may be a natural product or a synthetic product. As the natural product, any layered inorganic compound having swellability in water can be used without particular limitations so long as the compound is an inorganic compound which has a layered structure of repeating units based on a tetrahedral sheet formed by the coordination of oxygen ions to ions of silicon or aluminum and an octahedral sheet formed by the coordination of oxygen or hydroxide ions to ions of aluminum, magnesium, or iron and in which cations (e.g., $H^+$, $Na^+$, $Ca^{2+}$, $Mg^{2+}$, etc.) have been intercalated between negatively charged layers of the inorganic compound to thereby bond the layers and form a multilayer structure. Examples of the synthetic product include layered inorganic compounds having swellability in water, which is obtained by a method in which K ions as interlayer cations of fluorophlogopite are replaced with Na or Li and, simultaneously therewith, the cations in the tetrahedron are regulated so as to consist of Si ions.

Specifically, examples of the water-swellable layered inorganic compound include clay minerals such as smectites, e.g., montmorillonite, beidellite, nontronite, saponite, hectorite, sauconite, and stevensite, vermiculites, water-swellable fluoromica minerals, e.g., Na-type fluorotetrasilicomica, Na-type taeniolite, Li-type taeniolite, and Na-type hectorite, and synthetic micas. From the standpoint of swellability in water, smectites are preferred, and montmorillonite is especially preferred. Although examples of the interlayer cations of montmorillonite include sodium ions and calcium ions, the sodium ion type is especially suitable of these because this type has excellent swellability in water. Incidentally, incorporation of a phyllosilicate, which is a representative example of those water-swellable layered inorganic compounds, into an EVOH is a technique which itself is known.

The swelling capacity of the water-swellable layered inorganic compound (B) in water can be evaluated by the test method (volumetric method) in accordance with the Japan Bentonite Manufactures Association Standard (JBAS-104-77) [1977]. It is preferred to use a water-swellable layered inorganic compound having a value of the swelling capacity of generally 40 mL/2 g or higher, especially 50 mL/2 g or higher. Use of a layered inorganic compound having too low swelling capacity in water is undesirable because this compound is less apt to be exfoliated and the effect of improving gas barrier properties is not sufficiently obtained therewith.

The test method (volumetric method) in accordance with the Japan Bentonite Manufactures Association Standard is explained below in detail. The swelling capacity is determined by adding 2.0 g of a montmorillonite powder in ten batches to a measuring cylinder containing 100 mL of water, allowing the montmorillonite to sediment and stand for 24 hours after completion of the addition, and then reading the volume of the montmorillonite which has accumulated on the bottom of the measuring cylinder. This reading is taken as the swelling capacity, the unit of which is mL/2 g.

Furthermore, it is preferred that the water-swellable layered inorganic compound (B) should have a cation exchange capacity of generally 100 to 150 meq/100 g, preferably 100 to 130 meq/100 g, especially preferably 105 to 120 meq/100 g, because the effects and advantages of the invention are more remarkably obtained when the cation exchange capacity thereof is such a value. In case where the cation exchange capacity thereof is too low, swellability in water tends to decrease. In case where the cation exchange capacity thereof is too high, the layered inorganic compound tends to have enhanced interlaminar bonding force and is less apt to be exfoliated.

The water-swellable layered inorganic compound (B) to be used in the invention is one which has an aspect ratio of generally 50 or higher. A water-swellable layered inorganic compound having a high aspect ratio is preferred especially from the sandpoint of enabling them dispersed in an EVOH to produce an improved tortuous-path effect on gas molecules. It is preferred to use the compound having larger aspect ratio. The aspect ratio thereof is preferably 100 or higher, in particular, 200 or higher. The particle diameter is generally 10 to 3,000 nm, preferably 20 to 2,500 nm, especially preferably 100 to 2,000 nm, in terms of the value measure in accordance with JIS R 1629.

This water-swellable layered inorganic compound (B) may be one in which the original interlayer cations have been exchanged for organocations. Examples of methods for this exchange for organocations include a method in which a compound having an onium ion group, such as a quaternary ammonium salt, is mixed with the water-swellable layered inorganic compound (B).

Since the water-swellable layered inorganic compound (B) is highly hygroscopic, this compound has a moisture content of generally 5 to 10% by weight.

It is preferred that when the water-swellable layered inorganic compound (B) is added to the composition (α) of EVOH (A1) and water and the mixture is melt-kneaded, the moisture content of this water-swellable layered inorganic compound (B) should be generally lower than 25% by weight, preferably lower than 15% by weight, especially preferably lower than 10% by weight. In case where the moisture content thereof is too high, there is a possibility that this water-swellable layered inorganic compound (B) might be apt to agglomerate into balls and be difficult to stably fed in a given amount.

It is preferred that in the EVOH composite according to the invention, the proportion {(A1)+(A2)}/(B) of the EVOH (A), i.e., {EVOH (A1)+EVOH (A2)}, to the water-swellable layered inorganic compound (B) should be generally from 85/15 to 99.5/0.5, preferably from 90/10 to 99/1, especially from 93/7 to 98/2, in terms of weight ratio. In case where the proportion thereof is too low, the composite tends to have increased melt viscosity and hence reduced melt moldability. Conversely, in case where the proportion thereof is too high, there is a tendency that the effect of improving gas barrier properties is not sufficiently obtained.

Other resins may be mixed with the EVOH composite of the invention according to purposes. The content of the other resins in the EVOH composite of the invention is generally 30% by weight or lower, preferably 20% by weight or lower, especially preferably 10% by weight or lower, based on the overall weight of the EVOH composite. In case where the content thereof is too high, there is a possibility that the EVOH might be less apt to form a continuous phase in the EVOH composite, resulting in considerably lowered gas barrier properties of the EVOH composite.

Examples of those other resins include thermoplastic resins, and specific examples thereof include polyolefin-based resins, polyester-based resins (including polyester copolymers), polyamide-based resins (including polyamide copolymers), polystyrene-based resins, polyvinyl chloride-based resins, polyvinylidene chloride, acrylic-based resins, vinyl ester-based resins, polyester elastomers, polyurethane elastomers, chlorinated polyethylene, chlorinated polypropylene, aromatic and aliphatic polyketones, and aliphatic polyalcohols. In the case where hot-water resistance and resistance to retortion, for example, are required, it is preferred to mix a polyamide-based resin. When flexibility, flexing fatigue resistance, and impact resistance are required, it is preferred to mix a polyolefin-based resin, polyester elastomer, polyurethane elastomer, or the like.

Examples of the polyolefin-based resins include homo- or copolymers of olefins, such as linear low-density polyethylene (LLDPE), low-density polyethylene (LDPE), very low-density polyethylene (VLDPE), medium-density polyethylene (MPPE), high-density polyethylene (HDPE), ethylene/vinyl acetate copolymers (EVA), ionomers, ethylene-propylene (block or random) copolymers, ethylene-acrylic acid copolymers, ethylene-acrylic ester copolymers, ethylene-methacrylic acid copolymers, ethylene-methacrylic ester copolymers, polypropylene, propylene-α-olefin (α-olefin having 4 to 20 carbon atoms) copolymers, polybutene, polypentene, and polymethylpentene, ones obtained by modifying these olefin homo- or copolymers by grafting thereonto an unsaturated carboxylic acid or an ester thereof, and blends of these. Of these, linear low-density polyethylene (LLDPE), low-density polyethylene (LDPE), very low-density polyethylene (VLDPE), ethylene/vinyl acetate copolymers (EVA), and ionomers are preferred from the standpoint that the EVOH composite obtained is excellent in flexibility, flexing fatigue resistance, impact resistance, etc.

Examples of the polyamide resins include polycapramide (nylon 6), poly-co-ω-aminoheptanoic acid (nylon 7), poly-ω-aminononanoic acid (nylon 9), polyundecanamide (nylon 11), polylauryllactam (nylon 12), polyethylenediamineadipamide (nylon 26), polytetramethyleneadipamide (nylon 46), polyhexamehyleneadipamide (nylon 66), polyhexamethylenesebacamide (nylon 610), polyhexamethylenedodecamide (nylon 612), polyoctamethyleneadipamide (nylon 86), polydecamethyleneadipamide (nylon 108), a caprolactam/lauryllactam copolymer (nylon 6/12), a caprolactam/ω-aminononanoic acid copolymer (nylon 6/9), a caprolactam/hexamethylenediammonium adipate copolymer (nylon 6/66), a lauryllactam/hexamethylenediammonium adipate copolymer (nylon 12/66), an ethylenediamineadipamide/hexamethylenediammonium adipate copolymer (nylon 26/66), a caprolactam/hexamethylenediammonium adipate/hexamethylenediammonium sebacate copolymer (nylon 66/610), an ethyleneammonium adipate/hexamethylenediammonium adipate/hexamethylenediammonium sebacate copolymer (nylon 6/66/610), polyhexamethyleneisophthalamide, polyhexamethyleneterephthalamide, a hexamethyleneisophthalamide/terephthalamide copolymer, ones obtained by modifying these polyamide-based resins with an aromatic amine such as methylenebenzylamine or metaxylenediamine, and metaxylenediammonium adipate. Of these, polycapramide (nylon 6), the caprolactam/lauryllactam copolymer (nylon 6/12), and the caprolactam/hexamethylenediammonium adipate copolymer (nylon 6/66) are preferred from the standpoint that the EVOH composite obtained is excellent in hot-water resistance, resistance to retortion, etc.

For the purpose of improving the thermal stability of the EVOH composite/polyamide resin mixture, use of a polyamide-based resin having terminals controlled with carboxyl groups or amino groups is suitable. As this polyamide-based resin having terminals controlled with carboxyl groups or amino groups, use may be made of a polyamide-based resin which includes caproamide as main structural units and which has been regulated with a terminal controlling agent so as to have a terminal carboxyl group content [Y] and a terminal amino group content [Z] that satisfy $\{(100\times[Z])/([Y]+[Z])\}\geq 5$ (wherein the units of [Y] and [Z] are µeq/g·polymer).

As the terminal controlling agent, use may be made of a carboxylic acid having 2 to 23 carbon atoms or a diamine having 2 to 20 carbon atoms. Examples of the monocarboxylic acid having 2 to 23 carbon atoms include aliphatic monocarboxylic acids (e.g., acetic acid, propionic acid, butyric acid, valeric acid, caproic acid, enanthic acid, caprylic acid, capric acid, pelargonic acid, undecanoic acid, lauric acid, tridecanoic acid, myristic acid, myritoleic acid, palmitic acid, stearic acid, oleic acid, linolic acid, arachidic acid, and behenic acid), alicyclic monocarboxylic acids (e.g., cyclohexanecarboxylic acid and methylcyclohexanecarboxylic acid), and aromatic monocarboxylic acids (e.g., benzoic acid, toluic acid, ethylbenzoic acid, and phenylacetic acid).

Examples of the diamine having 2 to 20 carbon atoms include aliphatic diamines [e.g., ethylenediamine, trimethylenediamine, tetramethylenediamine, pentamethylenediamine, hexamethylenediamine, octamethylenediamine, decamethylenediamine, dodecamethylenediamine, hexadecamethylenediamine, and 2,2,4-(or 2,4,4-)trimethylhexamethylenediamine], alicyclic diamines [e.g., cyclohexanediamine and bis(4,4'-aminocyclohexyl)methane], and aromatic diamines (e.g., xylylenediamine).

Besides those monocarboxylic acids, a dicarboxylic acid can be used either alone or in combination therewith. Examples of the dicarboxylic acid include aliphatic dicarboxylic acids (e.g., malonic acid, succinic acid, glutaric acid, adipic acid, pimellic acid, suberic acid, azelaic acid, sebacic acid, dodecanedioic acid, tetradecanedioic acid, hexadecanedioic acid, hexadecenedioic acid, octadecanedioic acid, octadecenedioic acid, eicosanedioic acid, eicosenedioic acid, docosanedioic acid, and 2,2,4-trimethyladipic acid), alicyclic dicarboxylic acids (e.g., 1,4-cyclohexanedicarboxylic acid), and aromatic dicarboxylic acids (e.g., terephthalic acid, isophthalic acid, phthalic acid, and xylylenedicarboxylic acid).

Various additives may be incorporated into the EVOH composite according to the invention, which comprises the EVOH (A) and the water-swellable layered inorganic compound (B), during the mixing or kneading of starting materials or during molding unless this incorporation defeats the objects of the invention. Examples of the additives include conventionally known plasticizers, heat stabilizers, light stabilizers, ultraviolet absorbers, antioxidants, pigments, colorants, natural fibers, various inorganic particles, various fillers, antistatic agents, release agents, plasticizers, perfumes, lubricants, crosslinking (vulcanizing) agents, crosslinking (vulcanization) accelerators, nucleating agents, crystallization accelerators, flame retardants, blowing agents, softeners, antiseptics, antibacterial/antifungal agents, and oxygen absorbents.

(Explanation of Production Process: Mixing of Composition (α) of EVOH (A1) and Water with Water-Swellable Layered Inorganic Compound (B))

The process for producing the EVOH composite of the invention is explained below.

The process for producing the EVOH composite of the invention is a process in which the composite is produced through mixing conducted in two stages, i.e., by mixing a composition (α) containing EVOH (A1) and having a relatively high moisture content with a water-swellable layered inorganic compound (B) and then mixing the resultant mixture (hereinafter referred to as composition (C)) with EVOH (A2). Although methods of the mixing are not particularly limited, melt mixing is preferred from the standpoint that this technique is capable of even mixing and attains excellent productivity.

Specifically, this process includes adding a water-swellable layered inorganic compound (B) to the composition (α) comprising EVOH (A1) and having a moisture content of 50% by weight or higher, melt-kneading them, and then mixing the resultant composition (C) with EVOH (A2).

When introduced into a melt mixer, the composition (α) of EVOH (A1) and water is required to have a relatively high moisture content. The moisture content thereof at this point of time is 50% by weight or higher, preferably 50 to 70% by weight, especially preferably 55 to 70% by weight.

In case where the moisture content thereof is too low, there is a tendency that the mixing of this composition (α) of EVOH (A1) and water with a water-swellable layered inorganic compound (B) results in an increased torque and the water-swellable layered inorganic compound is excessively smashed. In case where the moisture content thereof is too high, there is a tendency that the surface of the EVOH has a large amount of adherent water and this is difficult to feed when mixed, resulting in reduced productivity.

Usually, the resin ingredient in the composition (α) is mainly constituted of the EVOH (A1). Specifically, the EVOH (A1) usually accounts for 50 to 30% by weight.

The mixing ratio (A1)/(B) of the EVOH (A1) to the water-swellable layered inorganic compound (B) is a proportion which satisfies generally 90/10 to 50/50, preferably 90/10 to 60/40, especially preferably 90/10 to 70/30, in terms of weight ratio. In case where the mixing ratio (A1)/(B) is too high, there is a tendency that the solid ingredients are apt to separate out from the water during the mixing to give an unevenly mixed state and this results in strand breakage and hence in reduced production stability. In case where the mixing ratio (A1)/(B) is too low, there is a possibility that the composition (C) has reduced flowability and, hence, this composition (C) cannot be evenly diffused when mixed with EVOH (A2), and that fish eyes might be formed when the EVOH composite is formed into a film.

Meanwhile, when the other kind of resin is mixed according to need, examples of methods for this mixing include (1) a method in which the other kind of resin is made to coexist in the step of mixing the composition (α) containing EVOH (A1) and having a moisture content of 50% by weight or higher with a water-swellable layered inorganic compound (B), (2) a method in which the other kind of resin is made to coexist in the step of mixing the composition (C) with EVOH (A2), and (3) a method in which the other kind of resin is mixed with the EVOH composite of the invention by means of a blender or the like before the composite is molded. When the productivity of the EVOH composite and even dispersibility of mixed another kind of resin in the EVOH composite are taken into account, it is preferred to mix the other kind of resin using the method (2) to obtain an EVOH composite.

Examples of the other kind of resin include the same resins as those other resins shown above which may be mixed with the EVOH composite of the invention according to purposes.

(Method of Moisturizing, Method of Regulating Moisture Content)

There are no particular limitations on methods for incorporating water into an EVOH and regulating the moisture content thereof in order to obtain a composition (α) of EVOH (A1) and water. It is, however, preferred to employ, for example, a method in which water is evenly incorporated into an EVOH. Examples of such a method include (i) a method in which a solution of an EVOH in a mixed solvent of a saturated hydrocarbon alcohol having 1 to 4 carbon atoms and water is added to water to precipitate particles of the EVOH and the EVOH particles are taken out by filtration and then sufficiently washed with water to remove the alcohol and thereby incorporate water, (ii) a method in which an EVOH is treated in pressurized hot water for about 1 to 3 hours, and (iii) a method in which a paste resulting from saponification of an ethylene-vinyl acetate copolymer in EVOH production is introduced into water to precipitate as a solid in the form of strands or the like and thereby incorporate water. Of these, the method (iii) is preferred. Although EVOH particles or pellets may be directly mixed with water, it is necessary to carefully regulate mixing conditions concerning temperature and stirring so that water is evenly incorporated into the EVOH.

The method (iii) for obtaining a composition (α) of an EVOH and water is explained in detail. As is known, an EVOH is obtained by saponifying an ethylene-vinyl acetate copolymer. This saponification is conducted in the following manner. The ethylene-vinyl acetate copolymer is dissolved, for example, in a saturated hydrocarbon alcohol having 1 to 4 carbon atoms or in a medium containing the alcohol, in such an amount as to have a concentration of generally about 20 to 60% by weight, preferably 30 to 60% by weight, especially preferably 35 to 55% by weight. A known alkali catalyst or acid catalyst is added thereto, and the copolymer is reacted at a temperature of generally 40 to 140° C., preferably 80 to 140° C., especially preferably 100 to 130° C. The concentration of the EVOH resulting from the reaction conducted at that solution temperature is not particularly limited so long as care should be taken not to allow the EVOH to precipitate. However, the concentration thereof may be regulated to generally 10 to 55% by weight, preferably 15 to 50% by weight.

The thus-obtained EVOH solution in a saturated hydrocarbon alcohol having 1 to 4 carbon atoms may be used as it is. Preferably, however, a solution for strand production is prepared therefrom by directly adding water to that solution or by suitably concentrating or diluting the alcohol solution of the EVOH and then adding water thereto. In the case of the water/alcohol mixture solution, it is preferred, from the standpoint of the stability of the solution, that the water/alcohol mixing ratio should be generally in the range of 80/20 to 5/95 by weight and the alcohol content α (% by weight) should generally satisfy the relationship $2.55E-40.75 \leq \alpha \leq 2.55E-15.75$ (wherein E is the ethylene content (% by mole) of the EVOH). It is preferred that the EVOH content in the solution should be generally 20 to 55% by weight, preferably 25 to 50% by weight, from the standpoint of stably conducting the subsequent operation for coagulation.

Subsequently, the EVOH solution obtained above is extruded in the form of a strand and pelletized. At this point of time, known ingredients such as a lubricant, inorganic acid, organic acid, inorganic salt, organic salt, plasticizer, antioxidant, ultraviolet absorber, colorant, antibacterial agent, and antiblocking agent may be incorporated thereinto.

As a coagulating liquid for precipitation, use is made of water, a water/alcohol mixed solvent, an aromatic hydrocarbons such as benzene, a ketones such as acetone or methyl ethyl ketone, an ethers such as dipropyl ether, an organic-acid ester such as methyl acetate, ethyl acetate, or methyl propionate, or the like. However, water or a water/alcohol mixed solvent is preferred from the standpoint of ease of handling. As the alcohol, use is made of an alcohol having 1 to 4 carbon atoms, such as methanol, ethanol, or propanol. However, it is industrially preferred to use methanol.

The weight ratio of the coagulating liquid to the EVOH strand (coagulating liquid/EVOH strand) in the coagulating liquid is generally from 50 to 10,000, preferably from 100 to 1,000. By regulating the weight ratio thereof so as to be within that range, EVOH pellets having an even dimension distribution can be obtained.

It is also preferred to incorporate at least one of carboxylic acids, metal salts of carboxylic acids, and esters of carboxylic acids into the coagulating liquid.

The temperature at which the EVOH solution is contacted with the coagulating liquid is generally −10 to 40° C., preferably 0 to 20° C., especially preferably 0 to 10° C., from the standpoint of precipitability. Using a nozzle having any desired shape, the EVOH solution is extruded in the form of a strand in the coagulating liquid described above. Although the shape of the nozzle is not particularly limited, a cylindrical shape is industrially preferred. The length thereof is generally 1 to 100 cm, preferably 3 to 30 cm, and the inner diameter thereof is generally 0.1 to 10 cm, preferably 0.2 to 5.0 cm. Although the EVOH solution is thus extruded in a strand form from a nozzle, the number of such strands need not be always one and the EVOH solution can be extruded so as to form any desired number of strands in the range of several strands to several hundred strands.

Subsequently, the EVOH extruded in the form of a strand is cut into pellets after coagulation thereof has sufficiently proceeded, and is then washed with water. From the standpoint of stability of melt kneading, the shape of the pellets is preferably as follows. In the case of a cylindrical shape, this shape has a diameter of 1 to 10 mm and a length of 1 to 10 mm, in particular, has a diameter and a length of 2 to 6 mm each. In the case of a spherical shape, this shape has a diameter of 1 to 10 mm, in particular, 2 to 6 mm.

With respect to conditions of the water washing, the pellets are washed with water in a water tank kept at generally 10 to 40° C., preferably 20 to 40° C. The oligomers, impurities, solvent, and other substances contained in the EVOH are removed through this water washing. Subsequently to the water washing or in place of the water washing, the pellets may be treated in an aqueous solution containing acetic acid, phosphoric acid, boric acid, and metal salts of these to thereby incorporate the acids and metal salts into the EVOH. This treatment also is preferred because the EVOH after drying is improved in color tone, thermal stability, long-run moldability, adhesion to the layer of an adherent resin in laminates, suitability for stretch forming with heating, etc. Especially preferred as such ingredient is acetic acid, phosphoric acid, boric acid, or an alkali metal salt or alkaline earth metal salt thereof from the standpoint of the excellent effects thereof.

By the method described above, the composition ($\alpha$) containing EVOH (A1) and having a moisture content of 50% by weight or higher is obtained. It is also preferred that a known drying treatment (e.g., hot-air drying, drying by induction heating, or drying by irradiation with microwaves) should be conducted according to need in order to precisely regulate the moisture content or that an operation for removing the water adherent to the surface of the moisture-containing pellets should be performed before melt kneading in order to improve stability of the melt kneading.

(Machines for use in Melt Mixing)

The composition ($\alpha$) thus obtained, which contains EVOH (A1) and has a moisture content of 50% by weight or higher, is melt-mixed with a water-swellable layered inorganic compound (B). This melt mixing may be conducted using a known melting kneader. The apparatus, method, etc. to be used are not particularly limited, and use can be made of a known method in which a known kneading (mixing) apparatus such as, for example, an extruder, kneader, mixing rolls, banbury mixer, PLASTOMILL, or Brabender plastograph is used. These kneading apparatus may be used alone, or two or more thereof may be used in combination. The apparatus to be used may be suitably selected according to the kinds, properties, and shapes of the EVOH (A1) and water-swellable layered inorganic compound (B), etc. Usually, apparatus in wide industrial use, such as single screw extruders, twin screw extruders, banbury mixers, and kneaders, are suitable for use here. Of these, twin screw extruders are most suitable because the extruders attain excellent evenness and stability of mixing.

A twin screw extruder which is usable in the invention is explained below. This extruder is a known apparatus and is not particularly limited. However, the twin screw extruder may be specifically described, for example, as follows. The inner diameter of the barrel thereof is generally 10 mm or larger, preferably 15 mm to 150 mm. In case where the inner diameter thereof is too small, sufficient productivity tends to be unobtainable. The L/D is generally 10 to 80. In case where the value thereof is too small, this extruder tends to be insufficient in the ability to mix the composition ($\alpha$) ingredient of EVOH (A1) and water with a water-swellable layered inorganic compound (B) ingredient. In case where the value thereof is too large, there is a tendency that the kneading time is longer and, hence, the water-swellable layered inorganic compound is smashed, making it impossible to obtain the desired resin.

Furthermore, the screw design of the twin screw extruder is not particularly limited. However, in the case where the inner diameter of the barrel is 20 mm or larger, it is preferred that at least one kneading zone should be included in order that the composition ($\alpha$) of EVOH (A1) and water in the solid state be brought to a molten state. Moreover, the screw rotation speed also is not particularly limited. However, the rotation speed thereof is generally 10 to 400 rpm, preferably 30 to 300 rpm. In case where the value thereof is too small, this extruder tends to be insufficient in the ability to mix the composition ($\alpha$) ingredient of EVOH (A1) and water with a water-swellable layered inorganic compound (B) ingredient. In case where the value thereof is too large, there is a tendency that shear heating occurs and the resultant foaming causes strand breakage to reduce productivity. There also is a tendency that the amount of moisture in the mixing system decreases to result in an increase in torque when mixing and the water-swellable layered inorganic compound is hence smashed, making it impossible to obtain the desired resin. The residence time in the extruder is generally 10 to 600 seconds, preferably 10 to 300 seconds. In case where the value thereof is too small, this extruder tends to be insufficient in the ability to mix the composition ($\alpha$) ingredient of EVOH (A1) and water with a water-swellable layered inorganic compound (B) ingredient. In case where the value thereof is too large, there is a tendency that the amount of moisture in the mixing system decreases to result in an increase in torque when mixing and the water-swellable layered inorganic compound is hence smashed, making it impossible to obtain the desired resin.

With respect to the vent also, there are no particular limitations. It is, however, preferred to conduct the processing while keeping the vent hole closed in order to inhibit water volatilization during the processing. As a side feeder, a screw feeder (single screw or twin screw) or the like may be disposed on the extruder in the case where the water-swellable layered inorganic compound (B) ingredient is fed in a powder state or flaky state. In the case where the water-swellable layered inorganic compound (B) ingredient is fed in the form of an aqueous dispersion, a gear pump for liquid addition or a plunger pump or the like may be disposed on the extruder. The position where a side feeder is to be disposed is not particularly limited. However, from the standpoint of inhibiting the water-swellable layered inorganic compound from being smashed during the mixing, it is suitable to dispose the side feeder after the first kneading zone in which the composition ($\alpha$) of EVOH (A1) and water is brought into a molten state. For the purpose of removing the generated water (liquid) separated from the solid ingredients during kneading, the extruder may be equipped with at least one of gas- and liquid-discharging means such as a slit barrel, a drainage port, and a liquid discharge pump.

Temperatures for the melt kneading are not particularly limited. However, the temperatures of the parts ranging from a lower part of the hopper to the die part are generally lower than 100° C. Preferably, the temperature of the lower part of the hopper is 50 to 80° C. and those of the barrel part and the die part are 80 to 100° C. In case where the temperatures of the parts ranging from the lower part of the hopper to the die part are too high, there are a tendency that strand breakage occurs due to foaming, resulting in reduced productivity, and a tendency that the amount of moisture in the mixing system decreases to result in an increase in torque when mixing and the water-swellable layered inorganic compound is hence smashed, making it impossible to obtain the desire resin. In case where the temperature of the lower part of the hopper is too high, there is a tendency that the moisture-containing EVOH pellets are fusion-bonded to one another at the sample feed part to cause blocking, resulting in reduced productivity.

The temperature of the resin composition during the melt kneading is generally 80° C. to 105° C., preferably 90° C. to 100° C. In case where the temperature thereof is too high, there are a tendency that strand breakage occurs due to foaming, resulting in reduced productivity, and a tendency that the amount of moisture in the mixing system decreases to result in an increase in torque when mixing and the water-swellable layered inorganic compound is hence smashed, making it impossible to obtain the desire resin. In case where the temperature thereof is too low, there is a tendency that the composition ($\alpha$) of EVOH (A1) and water shows reduced fusion bondability and strand breakage hence occurs, resulting in reduced productivity. Incidentally, the temperature of the resin composition during the processing can be measured with a thermometer for resins which is disposed in the die part.

(Mixing Technique)

Methods for feeding the composition ($\alpha$) of EVOH (A1) and water and a water-swellable layered inorganic compound (B) to the twin screw extruder are not particularly limited. Examples thereof include (1) a method in which the composition ($\alpha$) of EVOH (A1) and water and the water-swellable layered inorganic compound (B) which is in a solid state, e.g., a powder or flaky state, are introduced at once into the hopper of the extruder, (2) a method in which the composition ($\alpha$) of EVOH (A1) and water is introduced into the hopper of the extruder and the water-swellable layered inorganic compound (B) in a solid state is fed through part of the barrel of the extruder (side feeding), (3) a method in which the composition ($\alpha$) of EVOH (A1) and water and a dispersion prepared beforehand by dispersing the water-swellable layered inorganic compound (B) in water are introduced at once into the hopper of the extruder, and (4) a method in which the composition ($\alpha$) of EVOH (A1) and water is introduced through the hopper of the extruder and a dispersion prepared beforehand by dispersing the water-swellable layered inorganic compound (B) in water is fed through part of the barrel of the extruder (side feeding). The methods (1) and (2) are suitable because the amount of the water-swellable layered inorganic compound (B) to be introduced can be easily increased. Most suitable is the method (2) because blocking can be inhibited from occurring at the hopper feed part and satisfactory handleability during production is obtained.

Thus, a composition (C) obtained by mixing the composition ($\alpha$) of EVOH (A1) and water with the water-swellable layered inorganic compound (B) is discharged from the extruder. Although the shape of this composition (C) is not particularly limited, it is preferred to obtain the composition (C) in the form of pellets, from the standpoint of handleability. Methods for pelletizing are not particularly limited, and examples thereof include (1) a method in which the composition (C) is discharged in the form of a strand, cooled to solidification (by contacting with a coagulating bath, e.g., water, or air-cooling by conveyance with a belt), and then cut with a pelletizer, and (2) a method in which the composition (C) is cut in the air or in water when the resin remains in a molten state.

(Explanation of Moisture Content of Composition (C) Immediately After Kneading)

The moisture content of the composition (C) immediately after discharge from the extruder is generally 40% by weight or higher and less than 70% by weight, preferably 45 to 65% by weight, especially preferably 45 to 60% by weight. In case where the moisture content thereof is too low, there is a possibility that the mixing of the composition ($\alpha$) ingredient of EVOH (A1) and water with the water-swellable layered inorganic compound (B) ingredient results in an increase in torque and the water-swellable layered inorganic compound is hence excessively smashed, whereby the effect of improving gas barrier properties is not sufficiently obtained. In case where the moisture content thereof is too high, the mixing of the composition (C) with EVOH (A2), which will be described later, is apt to cause separation of water from the solid ingredients, resulting in an unevenly mixed state. There is hence a tendency that films of the EVOH composite have a poor appearance and strand breakage occurs to reduce processability.

(Explanation of Composition (C))

The amount of the water-swellable layered inorganic compound (B) in the composition (C) is specified below in terms of the amount thereof based on the overall weight of the composition (C') which is the composition (C) in the state of having a moisture content regulated to 0.3% by weight. Namely, the amount of the water-swellable layered inorganic compound (B) in the composition (C) is generally 10 to 50% by weight, preferably 15 to 40% by weight, more preferably 17 to 30% by weight, based on the overall weight of the composition (C'), which is in the state of having a moisture content of 0.3% by weight. In case where the amount of the water-swellable layered inorganic compound (B) ingredient incorporated is too small, the mixing of the composition (C) with EVOH (A2), which will be described later, is apt to cause separation of water from the resin ingredients, resulting in an unevenly mixed state. There is hence a tendency that films of the EVOH composite have a poor appearance and strand breakage occurs to reduce processability. In case where the amount thereof is too large, there is a tendency that when the composition (C) obtained is mixed with EVOH (A2) to obtain an EVOH composite of the invention, the water-swellable layered inorganic compound (B) comes into an insufficiently dispersed state, resulting in an impaired film appearance.

It is preferred that the proportion (A1)/(B) of the EVOH (A1) to the water-swellable layered inorganic compound (B) in the composition (C) should be generally from 50/50 to 90/10, preferably from 60/40 to 85/15, especially from 70/30 to 83/17, in terms of weight ratio. In case where the mixing ratio thereof is too high, there is a tendency that the solid ingredients are apt to separate out from the water during the mixing to give an unevenly mixed state and this results in strand breakage and hence in reduced production stability. In case where the mixing ratio (A1)/(B) is too low, the composition (C) has reduced flowability and, hence, this composition (C) cannot be evenly diffused when mixed with EVOH (A2). There is hence a possibility that fish eyes might be formed when the EVOH composite is formed into a film.

(Mixing of Composition (C) Ingredient with EVOH (A2) Ingredient)

Subsequently, the composition (C) obtained by the method described above is mixed with EVOH (A2).

The mixing ratio of the composition (C) to the EVOH (A2) in this operation is specified below in terms of mixing ratio of the composition (C') which is the composition (C) in the state of having a moisture content regulated to 0.3% by weight. Namely, the two ingredients are mixed in such a ratio which satisfies that the mixing ratio (C')/(A2) of the composition (C'), which is the composition (C) in the state of having a moisture content of 0.3% by weight, to the EVOH (A2) is generally from 1/99 to 50/50, preferably from 5/95 to 45/55, especially preferably from 10/90 to 40/60, in terms of weight ratio. In case where the mixing ratio (C')/(A2) is too high, the composition (C) cannot be evenly diffused when mixed with the EVOH (A2) and there is hence a possibility that fish eyes might be formed when the EVOH composite is formed into films. In case where the mixing ratio (C')/(A2) is too low, there is a tendency that the effect of improving gas barrier properties, which is a feature of the invention, is not sufficiently obtained.

In the mixing of the composition (C) with the EVOH (A2), the EVOH (A1)/EVOH (A2) ratio is generally from 1/99 to 45/55, preferably from 5/95 to 40/60, especially preferably from 10/90 to 35/65, in terms of weight ratio.

The EVOH (A2) is a known general EVOH like the EVOH (A) described above. The EVOH (A2) to be used may be an EVOH resin itself which is on the general market, or a composition of EVOH (A2) and water may be used like the composition (α) of EVOH (A1) and water. From the standpoint of productivity, it is preferred to use not the composition of EVOH (A2) and water but an EVOH resin for molding which is on the general market. This EVOH resin for molding which is on the general market has a moisture content of generally less than 0.5% by weight, preferably 0.3% by weight or lower. In case where the moisture content thereof is too high, there is a tendency that the EVOH is fusion-bonded to itself at the sample feed part to cause blocking, resulting in reduced productivity. In addition, the resultant discharged tends to have an increased moisture content.

From the standpoint of further improving the appearance of films to be obtained from the EVOH composite to be obtained, the moisture content of the composition (C) at the time when the composition (C) is mixed with EVOH (A2) is 10% by weight or higher and less than 60% by weight. In particular, the moisture content thereof is preferably 20% by weight or higher and less than 60% by weight, and is especially preferably 45% by weight or higher and less than 60% by weight.

In case where the moisture content thereof is too low, this composition (C) has poor flowability and cannot be evenly diffused in the EVOH (A2). There is hence a possibility that formation of the EVOH composite into films results in fish eyes due to agglomeration. In addition, when the moisture contained in a large amount in the composition (C) is removed using a known dryer or the like, a large quantity of heat energy and a prolonged drying time are necessary. In this case, there is hence a possibility that the efficiency of drying and productivity decrease.

In case where the moisture content thereof is too high, there is a tendency that the composition (C) is fusion-bonded to itself due to the heat emitted by the extruder and blocking hence occurs, making it difficult to stably feed the composition.

The composition (C) may be slightly dried or moistened according to need in order to regulate the moisture content thereof.

Examples of methods for mixing the composition (C) with the EVOH (A2) include (1) a method in which the composition (C) is dried beforehand to control the moisture content thereof and this composition (C) is mixed with the EVOH (A2) by means of a melting kneader, (2) a method in which the composition (α) of EVOH (A1) and water is mixed with the water-swellable layered inorganic compound (B) ingredient by means of a melting kneader having a set temperature of 100° C. or higher, while drying to reduce moisture simultaneously with the kneading, and the composition (C) thus obtained is mixed with the EVOH (A2) by means of a melting kneader, and (3) a method in which the composition (C) is mixed with the EVOH (A2) by means of a melting kneader while drying to reduce moisture simultaneously with the kneading. However, the method (3) is especially preferred from the standpoints of inhibiting the water-swellable layered inorganic compound from being excessively smashed during the melt mixing, thereby inhibiting gas barrier properties from lowering, and inhibiting fish eyes from generating during film formation.

Methods for feeding each ingredient to the apparatus are also not particularly limited. Examples thereof include (1) a method in which the composition (C) and the EVOH (A2) are introduced at once into the hopper of the extruder, (2) a method in which the EVOH (A2) is introduced through the hopper of the extruder and the composition (C) is fed through part of the barrel of the extruder (side feeding), and (3) a method in which the composition (C) is introduced through the hopper of the extruder and the EVOH (A2) is fed through part of the barrel of the extruder (side feeding). The methods (1) and (2) are preferred from the standpoint of inhibiting the water-swellable layered inorganic compound from being excessively smashed during the mixing of the composition (C) with the EVOH (A2).

For this mixing, it is usually preferred to use a twin screw extruder as in the mixing of the composition (α) ingredient of EVOH (A1) and water with the water-swellable layered inorganic compound (B) ingredient described above. Also with respect to the barrel inner diameter, L/D, screw design, and screw rotation speed of the twin screw extruder, residence time in the extruder, and the bent and side feeder of the extruder, there are no particular limitations. Use can be made of the same twin screw extruder as for the mixing of the composition (α) ingredient of EVOH (A1) and water with the water-swellable layered inorganic compound (B) ingredient described above.

In the case where the composition (C) or the EVOH (A2) is to be fed with a side feeder in this operation, a screw feeder (single screw or twin screw) or the like may be disposed on the extruder. The position where a side feeder is to be disposed is not particularly limited. However, from the standpoint of inhibiting the water-swellable layered inorganic compound from being smashed during the mixing, it is suitable to dispose the side feeder after the first kneading zone, in which the EVOH is brought into a molten state.

Temperatures for the melt kneading are not particularly limited. However, the temperatures of the parts ranging from a lower part of the hopper to the die part are generally 150 to 250° C., preferably 160 to 240° C., especially preferably 180 to 230° C. In case where the temperatures thereof are too low, there is a tendency that the resin remains unmelted and the processing is in an unstable state. In case where the temperatures thereof are too high, there is a tendency that the EVOH composite has reduced quality due to thermal deterioration.

The EVOH composite is discharged usually in the state of a composition of the EVOH composite with water. For the purpose of reducing the moisture content thereof, it is preferred to configure the apparatus so that moisture is removed through at least one vent during the melt kneading. It is especially preferred to evacuate the extruder using a vacuum pump or the like from the standpoints of drying efficiency and inhibition of thermal deterioration of the EVOH composite.
(Methods of Drying)

Since the resultant EVOH composite of the invention is usually obtained in the state of a composition of the EVOH composite with water, drying is conducted before molding according to need.

For this drying, various methods can be employed. Examples thereof include: fluidized drying in which the EVOH composite substantially in a pellet form is dried while being stirred and dispersed either mechanically or by means of hot-air blowing; and static drying in which the EVOH composite substantially in a pellet form is dried without performing a dynamic operation such as a stirring or dispersing operation. Examples of dryers for conducting the fluidized drying include a columnar groove type stirring dryer, a columnar tube dryer, rotary dryer, fluidized bed dryer, vibrating fluidized bed dryer, and cone type rotary dryer, Examples of dryers for conducting the static drying include a batch type box dryer as a material static type dryer and a band dryer, tunnel dryer, and vertical dryer as material transfer type dryers. However, usable dryers should not be construed as being limited thereto. It is also possible to conduct fluidized drying and static drying in combination.

As a heating gas for the drying, use is made of air or an inert gas (e.g., nitrogen gas, helium gas, or argon gas). The temperature of the heating gas is generally 40 to 150° C. To conduct the drying in a reduced-pressure atmosphere (for example, $10^{-2}$ to $10^5$ Pa) is also preferred from the standpoint of preventing the EVOH composite from deteriorating thermally, because the EVOH composite can be dried at a lower temperature or in a shorter time period. The time period of the drying depends on the moisture content of the EVOH composite and the amount of the composite to be treated. However, from the standpoints of productivity and the prevention of thermal deterioration of the EVOH composite, the drying time is generally about from 15 minutes to 200 hours, preferably 20 minutes to 50 hours, especially preferably 30 minutes to 10 hours.

An EVOH composite is obtained under the conditions described above. The moisture content of the EVOH composite of the invention is generally 0.001 to 5% by weight, preferably 0.01 to 1% by weight, especially preferably 0.1 to 0.5% by weight. In case where the moisture content thereof is too low, this EVOH composite tends to have reduced long-run moldability when melt-molded. In case where the moisture content thereof is too high, foaming tends to occur during extrusion molding.

In the EVOH composite of the invention thus obtained, the content of the EVOHs (A), i.e., {EVOH (A1)+EVOH (A2)}, is generally 70 to 99.5% by weight, preferably 80 to 99% by weight, especially preferably 90 to 98% by weight, based on the overall weight of the EVOH composite. In case where the content of the EVOHs (A) is too low, there is a tendency that the EVOH do not form a continuous phase, resulting in lowered gas barrier properties. Conversely, in case where the content thereof is too high, there is a tendency that the effect of improving gas barrier properties, which is a feature of the invention, is not sufficiently obtained.
(Molding)

The EVOH composite of the invention is usually molded by melt molding or another technique into films, sheets, containers, fibers, rods, tubes, various molded articles, etc. and used in various applications. Comminuted particles obtained by comminuting such molded composite (for example, in the case of reusing recovered articles) may be subjected to melt molding again. For the melt molding, use is mainly made of extrusion molding (e.g., T-die cast film extrusion, tubular film extrusion, blow molding, melt spinning, or profile extrusion) or injection molding. A temperature for the melt molding is frequently selected from the range of generally 150 to 300° C., preferably 160 to 250° C., especially preferably 170 to 230° C. In case where the melt molding temperature is too low, melt moldability tends to be low due to insufficient flowability. In case where the melt molding temperature is too high, the EVOH composite tends to thermally deteriorate, resulting in appearance failures such as fish eyes and discoloration.

Although the EVOH composite of the invention can be used by itself as molded products, a laminate including at least one layer of the EVOH composite is especially useful as various molded products.
(Laminate)

Examples of methods for producing the laminate include a method in which a thermoplastic resin is melt-extruded on a film or sheet including the EVOH composite of the invention, a method in which conversely the EVOH composite is melt-extruded on a substrate such as a thermoplastic resin, a method in which the EVOH composite and another thermoplastic resin are coextruded, and a method in which a film or sheet including the EVOH composite is dry-laminated to another film or sheet substrate using a known adhesive such as an organotitanium compound, isocyanate compound, polyester-based compound, or polyurethane compound. It is also preferred that the EVOH composite obtained by the production process of the invention should be subjected to coextrusion.

Examples of the adherend resin in the case of coextrusion include known thermoplastic resins such as, for example, polyolefin-based resins, polyester-based resins, polyamide-based resins, polyimide copolymers, polystyrene-based resins, polyvinyl chloride-based resins, polyvinylidene chloride, acrylic-based resins, vinyl ester-based resins, polyester elastomers, polyurethane elastomers, chlorinated polyethylene, chlorinated polypropylene, aromatic and aliphatic polyketones, and aliphatic polyalcohols. Use of polyolefin-based resins is suitable because these resins have excellent mechanical properties and extrudability and are capable of accommodating various molding techniques.

As the polyolefin-based resins, the same resins as those enumerated above may be used. Preferred of these are linear low-density polyethylene (LLDPE), low-density polyethylene (LDPE), very low-density polyethylene (VLDPE), ethylene-vinyl acetate copolymers (EVA), and ionomers, because the multilayered packaging materials to be obtained are excellent in flexing fatigue resistance, oscillating fatigue resistance, etc.

The laminate may have the following layer configurations. When each layer including the EVOH composite of the invention is referred to as a (a1, a2, . . . ) and other substrate, for example, a thermoplastic resin layer, is referred to as b (b1, b2, . . . ), then not only the two-layer structure a/b but also any desired combinations such as b/a/b, a/b/a, a1/a2/b, a/b1/b2, b2/b1/a/b1/b2, b1/b2/a/b3/b4, and a1/b1/a2/b2 are also possible for the laminate which is in a film, sheet, or bottle shape. Also in the case of a fiber or filament shape, the same resins can be used and any desired combinations such as the a/b bimetal type, core (a)-sheath (b) type, core (b)-sheath (a) type, and eccentric core/sheath type are possible.

In those layer configurations, an adherent resin layer may be disposed between layers according to need. As the adherent resin, various adherent resins can be used. Although usable adherent resins vary depending on the kind of the resin b and cannot be unconditionally specified, examples thereof include a modified olefin-based polymer containing carboxyl groups which is obtained by chemically bonding an unsaturated carboxylic acid or the anhydride thereof to an olefin-based polymer (any of the polyolefin-based resins in a broad sense) by addition reaction, graft reaction, etc.

Specifically, suitable examples thereof include one member or a mixture of two or more members selected from polyethylene modified by grafting with maleic anhydride, polypropylene modified by grafting with maleic anhydride, ethylene-propylene (block or random) copolymers modified by grafting with maleic anhydride, ethylene-ethyl acrylate copolymers modified by grafting with maleic anhydride, ethylene-vinyl acetate copolymers modified by grafting with maleic anhydride, and the like. The amount of the unsaturated carboxylic acid or anhydride thereof incorporated into such olefin-based copolymer is preferably 0.001 to 3% by weight, more preferably 0.01 to 1% by weight, especially preferably 0.03 to 0.5% by weight. When the amount of the modifying compound incorporated into the modification product is too small, there are cases where adhesiveness is insufficient. Conversely, when the amount thereof is too large, there are cases where the modification product undergoes crosslinking reaction to come to have impaired moldability.

Furthermore, those adherent resins may be blended with the EVOH composite obtained by the production process of the invention or with another EVOH, a rubber or elastomer ingredient such as polyisobutylene or an ethylene-propylene rubber, the resin of the layer b, or the like. In particular, it is also possible to blend with a polyolefin resin different from the polyolefin resin serving as the base of the adherent resin.

The thickness of each layer of the laminate varies depending on the layer configuration, kind of b, use, container shape, required properties, etc., and cannot be unconditionally specified. However, it is usually preferred that the thickness of the layer a should be selected from the range of about 5 to 500 μm, desirably about 10 to 200 μm, that of the layer b be selected from the range of about 5 to 5,000 μm, desirably about 30 to 1,000 μm, and that of the adherent resin layer be selected from the range of about 5 to 400 μm, desirably about 10 to 150 μm. With respect to thickness ratio between the layer a and the adherent resin layer, the layer a is usually thicker, and the layer a/adherent resin layer thickness ratio is generally 1 to 100, preferably 1 to 50, especially preferably 1 to 10.

With respect to thickness ratio between the layer a and the layer b, the layer b is usually thicker when the total thicknesses of all layers of the same kind in the multilayered film are compared. The layer b/layer a thickness ratio is generally 1 to 100, preferably 3 to 20, especially preferably 6 to 15.

In case where the layer a is too thin, the results are insufficient gas barrier properties and unstable control of the thickness thereof Conversely, in case where the thickness thereof is too large, flexing fatigue resistance is poor and such large thicknesses are uneconomical. Too small and too large thicknesses of the layer a are hence undesirable. In case where the layer b is too thin, rigidity is insufficient. Conversely, in case where the thickness thereof is too large, such a laminate has poor flexing fatigue resistance and an increased weight. Too small and too large thicknesses of the layer b are hence undesirable. In case where the thickness of the adherent resin layer is too thin, interlaminar adhesion is insufficient and control of the thickness thereof is unstable. Conversely, in case where the thickness thereof is too large, the laminate has an increased weight and is not economical. Too small and too large thicknesses of the adherent resin layer are hence undesirable. For the purpose of improving moldability and various properties, the various additives described above and other ingredients including modifiers, fillers, and other resins can be added to each layer of the laminate so long as this addition does not lessen the effects of the invention.

It is also preferred to subject the laminate to stretching in order to improve the physical properties thereof. This stretching may be either uniaxial stretching or biaxial stretching. Stretching at a draw ratio as high as possible enables the laminate to give a stretched film, a stretched sheet, or a molded product, such as a stretched container or stretched bottle, that has satisfactory physical properties and does not develop or suffer pin holes, cracks, stretching unevenness, delamination, or the like when stretched. As a method for stretching, use can be made of roll stretching, tenter stretching, tubular stretching, stretch blow molding, or the like. Also usable besides these is a stretching technique involving a high draw ratio which is selected from deep drawing, vacuum-pressure forming, and the like. In the case of biaxial stretching, either the simultaneous biaxial stretching mode or the sequential biaxial stretching mode can be employed. A stretching temperature is selected from the range of generally about 60 to 170° C., preferably about 80 to 160° C. In case where the stretching temperature is lower than 60° C., stretchability is poor. In case where the stretching temperature exceeds 170° C., it tends to be difficult to maintain a stable stretched state.

It is also preferred that after completion of the stretching, heat fixation should subsequently be conducted for the purpose of imparting dimensional stability to the stretched film. The heat fixation can be performed by a known technique. The stretched film is heat-treated, for example, at a temperature of generally 80 to 170° C., preferably 100 to 160° C., for generally about 2 to 600 seconds while keeping the stretched film under tension. When the laminate is to be used for the heat-shrink packaging of raw meat, processed meat, cheese, or the like, then the stretched film, without undergoing heat fixation after the stretching, is used as a product film in a manner such that the raw meat, processed meat, cheese, or the like is wrapped in the film and this film is thereafter heat-treated at generally 50 to 130° C., preferably 70 to 120° C., for generally about 2 to 300 seconds to thermally shrink the film and thereby conduct tight packaging.

The laminate by itself can be used in various shapes. The laminate may have any desired shape, and examples thereof include films, sheets, tapes, bottles, pipes, filaments, and profile extruded articles. In the case of obtaining a cup- or tray-shaped multilayered container from a multilayered sheet or multilayered film, deep drawing is employed and examples thereof include vacuum forming, pressure forming, vacuum-pressure forming, and plug-assisted vacuum-pressure forming. Furthermore, in the case of obtaining a tube- or bottle-shaped multilayered container from a multilayered parison (a hollow tubular preform before being blown), blow molding is employed and examples thereof include extrusion blow molding (e.g., the two-head type, mold transfer type, parison shifting type, rotary type, accumulator type, and horizontal-parison type), cold-parison blow molding, injection blow molding, and biaxial stretch blow molding (e.g., extrusion type cold-parison biaxial stretch blow molding, injection type cold-parison biaxial stretch blow molding, and in-line injection molding type biaxial stretch blow molding). The laminate obtained can be subjected, according to need, to a heat treatment, cooling, rolling, printing, dry laminating, solution or melt coating, processing into a bag, deep drawing, processing into a box, processing into a tube, splitting, etc.

The containers thus obtained, which consist of cups, trays, tubes, bottles, or the like, and bags or cap members constituted of a stretched film are useful as containers for general foods and containers for various substances, e.g., condiments such as mayonnaise and dressings, fermented foods such as soybean paste (miso), edible fats and oils such as salad oil, beverages, cosmetics, medicines, detergents, perfumes, industrial chemicals, agricultural chemicals, and fuels.

EXAMPLES

The invention is explained below in detail with reference to Examples.

In the Examples, "parts" and "%" are on a weight basis unless otherwise indicated.

(Production of Composition (α) Including EVOH (A1) and Water)

Saponification reaction of 1,000 parts of a methanol solution containing in an amount of 40% of an ethylene-vinyl acetate copolymer having an ethylene content of 29% by mole was conducted at 110° C. for 2.5 hours while continuously feeding 40 parts of a methanol solution containing 6% sodium hydroxide and 2,500 parts of methanol and while distilling off the methyl acetate generating as a by-product and the excess methanol from the system. Thus, an EVOH in which the vinyl acetate moieties had a degree of saponification of 99.0% by mole was obtained. Subsequently, the excess methanol was distilled off while 450 parts of methanol containing 30% water was being fed at the azeotropic point to the liquid mixture which had undergone the saponification reaction. Thus, a solution of the EVOH in a water/methanol mixture (water/methanol=50/50 (by weight); resin concentration, 40%) was obtained. Subsequently, the EVOH solution in a water/methanol mixture (liquid temperature, 50° C.) was extruded in a strand shape from a nozzle having an orifice diameter of 4 mm into a coagulating liquid (95% water and 5% methanol) tank kept at 5° C., and was thus coagulated into a strand shape. Thereafter, the strand-shape coagulated EVOH was led to take-off rolls disposed at an end of the water tank and was cut with a cutter to obtain white porous pellets having a diameter of 4 mm and a length of 4 mm (resin content, 30%; moisture content, 25%; methanol content, 45%). Furthermore, the white porous pellets obtained were added to 1,000 parts of 30° C. warm water, and this was stirred for about 240 minutes to wash the pellets. Thus, pellets of a composition (α) including the EVOH (A1) and having a moisture content of 60% were obtained.

Example 1

The composition (α) having a moisture content of 60% including the EVOH (A1) and water, and natural montmorillonite ["Kunipia F", manufactured by Kunimine Industries Co., Ltd.; swelling capacity, 62 mL/2 g; cation exchange capacity, 109 meq/100 g; aspect ratio, 320] as a water-swellable layered inorganic compound (B) were fed to a twin screw extruder (screw diameter, 57 mm; L/D=44; OTE-57-II, manufactured by Osaka Seiki Kosaku) and melt-mixed. In this operation, the composition (α) having a moisture content of 60% including the EVOH (A1) was fed from the hopper part, while the water-swellable layered inorganic compound (B) was fed from a twin screw side feeder (disposed in the position C5). The mixing ratio (A1)/(B) of the EVOH (A1) ingredient to the water-swellable layered inorganic compound (B) ingredient was 80/20.

[Mixing Conditions]

Feed rate of the composition (α) including EVOH (A1) and water: 130 kg/hr (feed rate of EVOH (A1): 52 kg/hr)

Feed rate of water-swellable layered inorganic compound (B): 13 kg/hr

Screw design: ordinary kneading screws (kneading disk was disposed in C1-C5 and in C6-C13)

Screw rotation speed: 250 rpm

Die: strand die (diameter, 3.5 mm; eight holes)

Vents: open at C8 and C11 only; the others were closed

Set temperatures:

| | |
|---|---|
| C1 | 65° C. |
| C2 | 90° C. |
| C3 | 95° C. |
| C4 | 95° C. |
| C5 | 95° C. |
| C6 | 95° C. |
| C7 | 95° C. |
| C8 | 95° C. |
| C9 | 95° C. |
| C10 | 95° C. |
| C11 | 95° C. |
| C12 | 95° C. |
| C13 | 95° C. |
| AD | 95° C. |
| D | 95° C. |

Motor torque: 54 Amperes

The mixture was extruded in the form of strands from the strand die disposed at the outlet of the extruder and were cut with a pelletizer to obtain pellets of a composition (C) (moisture content, 46%; cylindrical shape with diameter of 2.5 mm and length of 3 mm). Subsequently, the composition (C) (moisture content, 46%) and EVOH (A2) (ethylene content, 29% by mole; degree of saponification, 99.5% by mole; MFR (210° C.), 8 g/10 min; moisture content, 0.3%) were fed to a twin screw extruder (screw diameter, 57 mm; L/D=44; OTE-57-II, manufactured by Osaka Seiki Kosaku) and melt-mixed. The EVOH (A2) was fed from the hopper part, while the composition (C) having a moisture content of 46%, was fed from a twin screw side feeder (disposed in the position C5). The mixing ratio (C')/(A2) of the composition (C') which was the composition (C) in the state of having a moisture content of 0.3% to the EVOH (A2) was 25/75 by weight.

[(C)/(A2) Mixing Conditions]

Feed rate of composition (C): 18.5 kg/hr
Feed rate of EVOH (A2): 30 kg/hr
Screw design: ordinary kneading screws
Screw rotation speed: 80 rpm
Die: strand die (diameter, 3.5 mm; eight holes)
Vents: open at C8; evacuated at C11; the others were closed
Set temperatures:

| | |
|---|---|
| C1 | 200° C. |
| C2 | 230° C. |
| C3 | 230° C. |
| C4 | 230° C. |
| C5 | 230° C. |
| C6 | 230° C. |
| C7 | 230° C. |
| C8 | 230° C. |
| C9 | 230° C. |
| C10 | 230° C. |
| C11 | 230° C. |
| C12 | 230° C. |
| C13 | 230° C. |
| AD | 230° C. |
| D | 230° C. |

Motor torque: 110 Amperes

The mixture was extruded in the form of strands from the strand die disposed at the outlet of the extruder and were cut with a pelletizer to obtain pellets of an EVOH composite (moisture content, 0.3%; cylindrical shape with diameter of 2.5 mm and length of 3 mm).

Some of the pellets obtained were put in a platinum vessel and the weight of the film (Wa; unit, g) was measured with an electronic weighing machine. Thereafter, this platinum vessel was placed for 1.5 hours in an electric furnace kept at 700° C. to burn off the EVOH component, subsequently taken out of the furnace, and then allowed to cool in a desiccator for 30 minutes. The weight of the resultant residue (Wb) was measured in the same manner. The amount of the water-swellable layered inorganic compound per 100 parts by weight of the EVOH was calculated using the following equation (1). As a result, the amount thereof was found to be 5.0 parts by weight. Namely, the proportion {(A1)+(A2)}/(B) of the EVOH {(A1)+(A2)} to the water-swellable layered inorganic compound (B) in the EVOH composite was 95/5 in terms of weight ratio.

$$\text{Amount of water-swellable layered inorganic compound (parts by weight)} = \{Wb/(Wa-Wb)\} \times 100 \quad (1)$$

The EVOH composite pellets of the invention obtained above were fed to a single screw extruder equipped with a T-die to produce a single-layer film (film thickness, 30 μm).

[Conditions for Forming Single-Layer Film]

Extruder: single screw extruder having diameter of 40 mm
Screw design: full-flighted (compression ratio, 3.5)
Screw rotation speed: 40 rpm
Screen pack: 90/120/90 mesh
Die: T-die (coat hanger type; die width, 450 mm)
Set temperatures:

| | |
|---|---|
| C1 | 210° C. |
| C2 | 230° C. |
| C3 | 230° C. |
| C4 | 230° C. |
| H | 230° C. |
| D | 230° C. |

Cooling roll temperature: 90° C.
Take-off speed: 8.9 m/min
Air gap: 100 mm (I) Evaluation of Oxygen Barrier Property Oxygen transmission rate was determined under the conditions of 23° C. and 80% RH using an oxygen transmission rate measuring apparatus ("OXTRAN TWIN", manufactured by MOCON Company). As a test gas, oxygen gas having a concentration of 100% was used. The results thereof are shown in Table 2.

(II) Tensile Test

The tensile properties of a film in MD were evaluated using Autograph ("AGS-H 5 kN", manufactured by Shimadzu Corp.) in accordance with JIS K7161. The results thereof are shown in Table 2.

Film sample: film humidified at 23° C. and 50% RH
Shape of test piece: JIS K7127, type 5
Pulling rate: 50 mm/min (III) Evaluation of Film Appearance A digital defect detector ("GX-70LT", manufactured by MAMIYA-OP) was used to count the number of fish eyes present in a 10 cm×10 cm area while grouping the fish eyes into two kinds: smaller fish eyes (having diameter of 0.1 mm or larger and less than 0.19 mm) and larger fish eyes (having diameter of 0.2 mm or larger). The results thereof are shown in Table 2.

Example 2

The same procedure as in Example 1 was conducted, except that among the conditions for mixing the composition (C) with the EVOH (A2), the moisture content of the composition (C) was changed to 25% and the feed rate of the composition (C) was changed to 13.5 kg/hr. The composition (C) having a moisture content of 25% was prepared by drying the composition (C) having a moisture content of 46% obtained from the extruder, by passing nitrogen gas having a temperature of 80° C. and a moisture content of 0.6% through the composition (C) for 45 minutes in a fluidized-bed dryer. The mixing ratio of the composition (C) to the EVOH (A2) was 25/75 by weight in terms of the mixing ratio of the composition (C') which was the composition (C) in the state of having a moisture content of 0.3% to the EVOH (A2), i.e., (C')/(A2). The resultant EVOH composite pellets had a moisture content of 0.15%, and the amount of the water-swellable layered inorganic compound per 100 parts by weight of the EVOH was 5.0 parts by weight. Namely, the proportion {(A1)+(A2)}/(B) of the EVOH {(A1)+(A2)} to the water-swellable layered inorganic compound (B) in the EVOH composite was 95/5 in terms of weight ratio.

A single-layer film (film thickness, 30 μm) for appearance evaluation was produced from the resultant EVOH composite under the same conditions as in Example 1 and subjected to the same evaluation.

Example 3

The same procedure as in Example 1 was conducted, except that among the conditions for mixing the composition (C) with the EVOH (A2), the moisture content of the composition (C) was changed to 15% and the feed rate of the composition (C) was changed to 11.7 kg/hr. The composition (C)

having a moisture content of 15% was prepared by drying the composition (C) having a moisture content of 46% obtained from the extruder, by passing nitrogen gas having a temperature of 80° C. and a moisture content of 0.6% through the composition (C) for 2 hours in a fluidized-bed dryer. The mixing ratio of the composition (C) to the EVOH (A2) was 25/75 by weight in terms of the mixing ratio of the composition (C') which was the composition (C) in the state of having a moisture content of 0.3% to the EVOH (A2), i.e., (C')/(A2). The resultant EVOH composite pellets had a moisture content of 0.15%, and the amount of the water-swellable layered inorganic compound per 100 parts by weight of the EVOH was 5.0 parts by weight. Namely, the proportion {(A1)+(A2)}/(B) of the EVOH {(A1)+(A2)} to the water-swellable layered inorganic compound (B) in the EVOH composite was 95/5 in terms of weight ratio.

A single-layer film (film thickness, 30 μm) for appearance evaluation was produced from the resultant EVOH composite under the same conditions as in Example 1 and subjected to the same evaluation.

Comparative Example 1

The same procedure as in Example 1 was conducted, except that among the conditions for mixing the composition (C) with the EVOH (A2), the moisture content of the composition (C) was changed to 5% and the feed rate of the composition (C) was changed to 10.5 kg/hr. The composition (C) having a moisture content of 5% was prepared by drying the composition (C) having a moisture content of 46% obtained from the extruder, by passing nitrogen gas having a temperature of 80° C. and a moisture content of 0.6% through the composition (C) for 16 hours in a fluidized-bed dryer. The mixing ratio of the composition (C) to the EVOH (A2) was 25/75 by weight in terms of the mixing ratio of the composition (C') which was the composition (C) in the state of having a moisture content of 0.3% to the EVOH composition (A2), i.e., (C')/(A2). The resultant EVOH composite pellets had a moisture content of 0.13%, and the amount of the water-swellable layered inorganic compound per 100 parts by weight of the EVOH was 5.0 parts by weight. Namely, the proportion {(A1)+(A2)}/(B) of the EVOH {(A1)+(A2)} to the water-swellable layered inorganic compound (B) in the EVOH composite was 95/5 in terms of weight ratio.

A single-layer film (film thickness, 30 μm) for appearance evaluation was produced from the resultant EVOH composite under the same conditions as in Example 1 and subjected to the same evaluation.

The conditions used in the Examples and Comparative Example given above and the results obtained therein are shown in Table 1 and Table 2.

TABLE 1

| | Conditions | | | | | | |
|---|---|---|---|---|---|---|---|
| | First Stage | | | Second Stage | | EVOH Composite Pellets | |
| | Condition of EVOH (A1) | Moisture content of composition (α) | Moisture content of composition (C) just after extrusion | Moisture content of composition (C) used | Condition of EVOH (A2) | Moisture content | Content of water-swellable layered compound (per 100 parts by weight of EVOH) |
| Example 1 | Ethylene content: 29 mol %; Degree of saponification: 99.0 mol % | 60% | 46% | 46% | Ethylene content: 29 mol %; Degree of saponification: 99.5 mol % | 0.3% | 5.0 parts by weight |
| Example 2 | Ethylene content: 29 mol %; Degree of saponification: 99.0 mol % | 60% | 46% | 25% | Ethylene content: 29 mol %; Degree of saponification: 99.5 mol % | 0.15% | 5.0 parts by weight |
| Example 3 | Ethylene content: 29 mol %; Degree of saponification: 99.0 mol % | 60% | 46% | 15% | Ethylene content: 29 mol %; Degree of saponification: 99.5 mol % | 0.15% | 5.0 parts by weight |
| Comparative Example 1 | Ethylene content: 29 mol %; Degree of saponification: 99.0 mol % | 60% | 46% | 5% | Ethylene content: 29 mol %; Degree of saponification: 99.5 mol % | 0.13% | 5.0 parts by weight |

TABLE 2

| | Evaluation of EVOH Composite Film | | | | | |
|---|---|---|---|---|---|---|
| | Oxygen Barrier properties | Tensile Properties | | | Film Appearance | |
| | Oxygen transmission rate (cc/m$^2$ · day · atm) | Yield stress (MPa) | Elongation at break (%) | Modulus (GPa) | Smaller fish eyes | Larger fish eyes |
| Example 1 | 0.32 | 81 | 410 | 2.5 | 2 | 1 |
| Example 2 | 0.34 | 82 | 350 | 2.5 | 21 | 4 |
| Example 3 | 0.4 | 79 | 380 | 2.2 | 35 | 6 |
| Comparative Example 1 | 0.37 | 80 | 360 | 2.3 | 45 | 14 |

In case where an EVOH composite layer having a large number of larger fish eyes with a diameter of 0.2 mm or larger is subjected to secondary processing, for example, for producing a stretched film or producing a drawn container by vacuum-pressure forming, this EVOH composite layer tends to develop a large amount of defects therein and come to have reduced gas barrier properties. Although see-through properties for the contents and a beautiful package appearance are necessary in the field of food packaging, the presence of a large number of smaller fish eyes is a factor which impairs the see-through properties and beautiful appearance.

In Examples 1 to 3, by properly regulating the moisture content of the composition (C) to be mixed with the EVOH (A2), not only high-quality films excellent in gas barrier properties and film rigidity and reduced in the number of fish eyes were obtained but also the efficiency of the drying for removing the moisture contained in the composition (C) was able to be improved. In contrast, in Comparative Example 1, the formation of the EVOH composite into a film resulted in a large amount of larger fish eyes, although the resultant film was excellent in gas barrier properties and film rigidity, probably because the composition (C) showed poor flowability and was unable to be evenly diffused in the EVOH (A2) and residual agglomerates of the composition (C) were causative of the larger fish eyes. Therefore, the superiority of use of the production process of the invention is obvious.

INDUSTRIAL APPLICABILITY

The film obtained from the EVOH composite obtained in the invention can be used by itself or as a laminated film with a film of another resin, such as a polyolefin or polyamide, or as a laminate thereof with any of various substrates. For example, molded containers, such as cups, trays, tubes, and bottles, and bags and cap members constituted of stretched films are suitable for use in applications such as containers for general foods and various containers, e.g., condiments such as mayonnaise and dressings, fermented foods such as soybean paste (miso), edible fats and oils such as salad oil, beverages, cosmetics, medicines, detergents, perfumes, industrial chemicals, agricultural chemicals, and fuels.

The invention claimed is:

1. A process for producing a composite of saponified product of an ethylene-vinyl ester-based copolymer, which comprises mixing, at a temperature of 80° C. to 105° C., a composition (A) containing a saponified product of ethylene-vinyl ester-based copolymer with a degree of saponification of 99 to 100% by mol (A1) and having a moisture content of 50% by weight or higher, with a water-swellable layered inorganic compound (B) to obtain a composition (C) having a moisture content of 10% by weight or higher and less than 60% by weight, and then mixing, at a temperature of 150° C. to 250° C., the composition (C) with a saponified product of ethylene-vinyl ester-based copolymer with a degree of saponification of 99 to 100% by mol (A2).

2. The process for producing a composite of saponified product of an ethylene-vinyl ester-based copolymer according to claim 1, wherein the saponified product of ethylene-vinyl ester-based copolymer (A2) has a moisture content of less than 0.5% by weight.

3. The process for producing a composite of saponified product of an ethylene-vinyl ester-based copolymer according to claim 1, wherein the mixing ratio (A1)/(B) of the saponified product of ethylene-vinyl ester-based copolymer (A1) to the water-swellable layered inorganic compound (B) is a proportion which satisfies 90/10 to 50/50 in terms of weight ratio.

4. The process for producing a composite of saponified product of an ethylene-vinyl ester-based copolymer according to claim 1, wherein the mixing ratio (C')/(A2) of a composition (C') which is the composition (C) in the state of having a moisture content regulated to 0.3% by weight to the saponified product of ethylene-vinyl ester-based copolymer (A2) is a proportion which satisfies 1/99 to 50/50 in terms of weight ratio.

5. The process for producing a composite of saponified product of an ethylene-vinyl ester-based copolymer according to claim 1, wherein the proportion {(A1)−(A2)}/(B) of the saponified products of ethylene-vinyl ester-based copolymers {(A1)+(A2)} to the water-swellable layered inorganic compound (B) is from 85/15 to 99.5/0.5 in terms of weight ratio in the composite of saponified product of an ethylene-vinyl ester-based copolymer.

6. The process for producing a composite of saponified product of an ethylene-vinyl ester-based copolymer according to claim 1, wherein the saponified product of ethylene-vinyl ester-based copolymer (A1) and the saponified product of ethylene-vinyl ester-based copolymer (A2) have an ethylene content of 20 to 60% by mole.

7. The process for producing a composite of saponified product of an ethylene-vinyl ester-based copolymer according to claim 1, wherein the saponified product of ethylene-vinyl ester-based copolymer (A1) and the saponified product of ethylene-vinyl ester-based copolymer (A2) have an MFR value of 1 to 100 g/10 min, as measured at 210° C. under a load of 2,160 g.

8. The process for producing a composite of saponified product of an ethylene-vinyl ester-based copolymer according to claim 1, wherein the water-swellable layered inorganic compound (B) is a smectite.

9. The process for producing a composite of saponified product of an ethylene-vinyl ester-based copolymer according to claim 1, wherein the water-swellable layered inorganic compound (B) has a swelling capacity in water of 40 mL/2 g or higher in terms of the value measured by the test method described in JBAS-104-77.

10. The process for producing a composite of saponified product of an ethylene-vinyl ester-based copolymer according to claim 1, wherein the water-swellable layered inorganic compound (B) has a particle diameter of 10 to 3,000 nm in terms of the value measured in accordance with JIS R 1629.

11. The process for producing a composite of saponified product of an ethylene-vinyl ester-based copolymer according to claim 1, wherein the composite of saponified product of an ethylene-vinyl ester-based copolymer has a moisture content of 0.001 to 5% by weight.

12. The process for producing a composite of saponified product of an ethylene-vinyl ester-based copolymer according to claim 1, wherein the saponified product of ethylene-vinyl ester-based copolymer (A1) and the saponified product of ethylene-vinyl ester-based copolymer (A2) are a saponified product of a copolymer of vinyl acetate and ethylene.

* * * * *